United States Patent [19]

Malfroid

[11] 3,979,368

[45] Sept. 7, 1976

[54] SUPER-HALOGENATED UNSATURATED POLYESTERS AND PROCESS FOR THEIR MANUFACTURE

[75] Inventor: Pierre Malfroid, Brussels, Belgium

[73] Assignee: Solvay & Cie, Brussels, Belgium

[22] Filed: Sept. 28, 1973

[21] Appl. No.: 401,806

[30] Foreign Application Priority Data
Nov. 10, 1972 Luxemburg.............................. 66454

[52] U.S. Cl.............................. 526/11.2; 260/75 EP; 260/75 H; 260/75 UA; 260/485 H; 260/486 H; 260/DIG. 24; 260/78.41

[51] Int. Cl.$^2$.......................................... C08G 63/68

[58] Field of Search......... 260/75 H, 75 EP, 75 UA, 260/DIG. 24, 485 G, 78.4 EP

[56] References Cited

UNITED STATES PATENTS

| | | | |
|---|---|---|---|
| 3,257,477 | 6/1966 | Hedrick............................... | 260/872 |
| 3,274,293 | 9/1966 | Elfers et al........................... | 260/869 |
| 3,328,485 | 6/1967 | Blaga et al.................... | 260/75 H X |

FOREIGN PATENTS OR APPLICATIONS

| | | |
|---|---|---|
| 1,149,532 | 5/1963 | Germany |
| 819,684 | 9/1959 | United Kingdom |
| 1,101,247 | 1/1968 | United Kingdom |
| 321,525 | 3/1972 | U.S.S.R. |

OTHER PUBLICATIONS

Odian, *Principles of Polymerization*, McGraw–Hill, N. Y. (1970), pp. 308–310, 463 & 464.

Lenz, *Organic Chemistry Of Synthetic High Polymers*, Interscience Publishers, N. Y. (1967), pp. 484–493, 510–514 & 541.

Bakalo, et al., Chemical Abstracts, vol. 59, 2959h (1963).

Wolf, et al., Chemical Abstracts, vol. 72; 32,289d (1970).

*Primary Examiner*—Murray Tillman
*Assistant Examiner*—W. C. Danison, Jr.
*Attorney, Agent, or Firm*—Spencer & Kaye

[57] ABSTRACT

Super-halogenated unsaturated polyesters having average molecular weights of between 300 and 3,000, comprising units derived from at least one α-epihalohydrin and from maleic anhydride and optionally from another cyclic organic anhydride, possessing a halogen content arising from super-halogenation of between 1 and 35% by weight and the process for their manufacture which is characterized in that maleic anhydride, alone or mixed with another cyclic organic anhydride, is copolymerized with at least one α-epihalohydrin in molar ratios of epihalohydrin to anhydride(s) of between 1:1 and 2:1, in the presence of a titanium tetrahalide, the halogen being preferably chosen from the group consisting of chlorine and bromine.

8 Claims, No Drawings

SUPER-HALOGENATED UNSATURATED POLYESTERS AND PROCESS FOR THEIR MANUFACTURE

The present invention relates to super-halogenated unsaturated polyesters and to the process for their manufacture.

The invention relates more particularly to super-halogenated unsaturated polyesters manufactured by copolymerisation of maleic anhydride, alone or mixed with another cyclic anhydride, and at least one α-epihalohydrin in the presence of a titanium tetrahalide as catalyst.

Synthetic materials derived from unsaturated polyesters are well known to those skilled in the art. By virtue of their good mechanical properties combined with a relatively low density, there are large markets for these products in civil, aeronautical and naval engineering, these being fields where the demand for fire-resistant materials is increasing. Now, synthetic materials derived from conventional polyesters possess the major disadvantage of being inflammable and of burning readily. It has thus proved to be absolutely necessary to improve the fire-resistance of these products.

For this purpose, it has already been proposed to incorporate into them inert or non-reactive flameproof additives such as antimony oxide, chlorinated paraffins or triphenylstilbene. This technique can provide only a very temporary flameproofing and leads, furthermore, to heterogeneous and opaque products, the mechanical properties of which are less good.

Another known technique, which is markedly more valuable because it leads to permanent flameproofing, consists of incorporating chemically into the polyester chain as it is being formed, a difunctional flameproofing substance, for example a halogenated substance such as chlorendic acid, tetrachlorophthalic acid or anhydride, or a chlorinated polyol or its corresponding epoxy derivative. Chlorinated organic acids and anhydrides, such as chlorendic acid, are unfortunately expensive and, furthermore, lead to the production of polymers which offer little resistance to chemical agents, which greatly limits their field of application. The use of epichlorohydrin, a readily available starting material which is much less expensive, as the flameproofing substance was claimed in British Pat. No. 819,684 of 21.2.1957 in the name of the Solvay & Cie. This patent describes the non-catalytic copolymerisation of α-epichlorohydrin and maleic anhydride. This reaction, which is extremely slow, takes place at a high temperature, which favours homopolymerisation of α-epichlorohydrin and leads to the production of chlorinated polyether-esters which make it possible to cover only a narrow range of reactivities during the subsequent copolymerisation. Moreover, the crosslinked resins derived from these polyether-esters possess a fire-resistance which is not optimum.

The use of acid catalysts such as $SnCl_4$ and $BF_3$ makes it possible to activate the copolymerisation of epichlorohydrin and maleic anhydride, but the manifestly higher reactivity of these catalysts towards the epoxy group also leads to the formation of polyether-esters, and does so no matter what the initial molar ratios are.

It has now been found, and this is one of the subjects of the invention, that it is possible to produce super-halogenated unsaturated polyesters by copolymerisation of at least one α-epihalohydrin and maleic anhydride and optionally another cyclic organic anhydride, in a ratio of epihalohydrin to the sum of the anhydrides present in 1:1 to 2:1, using a titanium tetrahalide.

The present invention relates more particularly to unsaturated polyesters having molecular weights of between 300 and 3,000, which are super-halogenated, that is to say which possess a halogen content higher than that of the monomers incorporated into the polyester chain, and contain units derived from at least one epihalohydrin and from maleic anhydride and optionally from another cyclic organic anhydride, and possess a halogen content arising from super-halogenation of between 1 and 35% by weight.

The halogen is preferably chosen from the group consisting of chlorine and bromine.

The chemical nature of the copolymerisable organic anhydride is not critical. This anhydride can be aliphatic, cycloaliphatic or aromatic, saturated or unsaturated and halogenated or non-halogenated. Examples of anhydrides which are suitable for copolymerisation with maleic anhydride and at least one α-epihalohydrin according to the invention are succinic, glutaric, citraconic, itaconic, tetrahydrophthalic, methylnadic, phthalic, dichloromaleic, tetrabromophthalic and chlorendic anhydrides.

An anhydride which is particularly preferred is phthalic anhydride.

The molar ratio of maleic anhydride to the other cyclic organic anhydride can vary to a certain extent. Generally, not more than one mol of the other cyclic organic anhydride and, preferably, not more than 0.5 mol, is used per mol of maleic anhydride.

The present invention also covers the use of the super-halogenated unsaturated polyesters according to the invention for the manufacture of crosslinked polyester resins by copolymerisation, in a manner which is in itself known, with a mono-ethylenically unsaturated monomer.

It is particularly surprising that titanium tetrahalides and these alone possess the ability of giving up at least a part of their halogen atoms to the polyester which is being formed and thus provide the super-halogenated nature of the latter. The action of these tetrahalides is thus not solely catalytic.

The method and the sites of attachment of the excess halogen are not known clearly.

In addition to the role of copolymerisation catalyst and halogenating agent, the tetrahalide also plays the role of a chain regulator.

The halogen content and the molecular weight of the quasi-alternating super-halogenated unsaturated polyesters according to the invention can thus be varied and controlled as a function of the titanium tetrahalide content of the copolymerisation medium.

The maximum content of ethylenic unsaturated bonds in the super-halogenated unsaturated polyesters according to the invention makes it possible, furthermore, to cover a very wide range of reactivities in copolymerisation, and thus diverse applications, by varying the degree of isomerisation of maleic unsaturated bonds into more reactive fumaric unsaturated bonds. More or less hard polymers, suitable for thin layer or bulk applications as well as for the manufacture of reinforced structures, correspond to high and medium high degrees of isomerisation. Flexible and soft polymers, used as additives for oils and natural or synthetic rubbers, correspond to very low or zero degrees of isomerisation.

Crosslinked polyester resins manufactured by using unsaturated polyesters according to the invention possess fire-resistance properties which are markedly improved relative to those of the polymers produced by crosslinking polyether-ester resins of the prior art, manufactured by employing epichlorohydrin and maleic anhydride; they are self-extinguishing.

These particular properties seem to be connected with the quasi-alternating structure and with the super-halogenation of the unsaturated polyesters of the invention.

Moreover, these crosslinked resins possess a high oxygen index, good resistance to ultra-violet rays, mechanical properties comparable to those of polymers manufactured by crosslinking conventional polyester resins and a resistance to chemicals equivalent to that of commercial compositions deemed to be resistant to chemicals. The crosslinked polyester resins according to the invention are resistant especially to attack by inorganic acids such as concentrated nitric and hydrochloric acids, organic acids such as 96% strength acetic acid, alkaline reagents such as sodium hypochlorite and 10% strength sodium hydroxide solution, and aromatic solvents such as toluene, aliphatic solvents such as heptane and chlorinated solvents such as carbon tetrachloride.

It thus appears that the halogenated unsaturated polyesters according to the invention are particularly valuable in that they make it possible to manufacture crosslinked resins which combine several desired properties and especially self-extinguishability and resistance to chemical agents.

The manufacture of the halogenated unsaturated polyesters according to the invention by copolymerisation of maleic anhydride, alone or mixed with another cyclic organic anhydride, and at least one α-epihalohydrin, in the presence of titanium tetrahalide, is carried out in accordance with the conditions generally adopted for reactions of this type, and in particular in the absence of water and oxygen, whilst flushing with nitrogen.

The concentration of titanium tetrahalide is not in itself critical and can vary within very wide proportions. It is nevertheless practical to keep it within certain limits so as to ensure that polyesters which have molecular weights and viscosities which enable them to be employed easily are produced. For this reason, 0.001 to 0.1 mol, and preferably 0.01 to 0.06 mol, of titanium tetrahalide is generally used per mol of the mixture of monomers.

The copolymerisation of at least one α-epihalohydrin and maleic anhydride in molar ratios of between 1:1 and 2:1, in the presence of 0.001 to 0.1 mol of titanium tetrahalide per mol of the mixture of monomers leads to the production of quasi-alternating halogenated unsaturated polyesters, the halogen content of which varies approximately between 20 and 55% by weight and the average molecular weight of which varies approximately between 3,000 and 300.

The halogen content arising from super-halogenation, that is to say that which was given to the polyester by the tetrahalide, is generally between 1 and 35% by weight.

A range of products which are particularly preferred comprises the polyesters which have a halogen content of 20 to 50% by weight and an average molecular weight of between 1,500 and 500.

The order in which the monomers and the titanium tetrahalide are introduced is in no way critical. Nevertheless, it is preferred to introduce the epihalohydrin gradually into the mixture of anhydride and titanium tetrahalide. This mixture can be dissolved in an inert diluent such as benzene, toluene, xylene, chlorobenzene or 1,2-dichloroethane.

The reaction temperature is not critical: the copolymerisation can be carried out between 20° and 150°C, and preferably between 60° and 90°C.

The super-halogenated unsaturated polyesters manufactured in this way, which are in the form of viscous to very viscous liquids; can then be subjected to a cis-trans isomerisation, which is carried out in a known manner, by means of heat or catalytically.

Thermal isomerisation is carried out advantageously by heating the chlorinated unsaturated polyester at between 100° and 250°C, and preferably between 120° and 200°C. The rate of isomerisation is a function of the temperature. At 200°C, about 20 minutes are sufficient to achieve degrees of isomerisation of the order of 90%. At 120°C, a heat treatment of about 15 hours is necessary in order to obtain degrees of isomerisation of this order of magnitude. The duration of the treatment at a given temperature depends on the desired reactivity during copolymerisation with the ethylenically unsaturated monomer and can vary approximately between a few minutes and a few hours.

The use of specific catalysts makes it possible to activate the isomerisation and/or to lower the isomerisation temperatures. Examples of catalysts known to those skilled in the art are halogens such as bromine and iodine, organic mono- or di-carboxylic acids and the corresponding acid chlorides, such as benzenecarboxylic acid and p-toluene-sulphonic acid or its chloride, and primary or secondary aliphatic amines or secondary cyclic amines such as piperidine.

The degree of isomerisation of the polyester and consequently its reactivity are not critical. They are controlled as a function of the field of application in which it is desired that the crosslinked polyester resin derived from the said polyester be used. In practice, degrees of isomerisation varying between 20 and 75% make it possible to cover the entire range of reactivities of commercial polyester resins.

After isomerisation, the super-halogenated unsaturated polyesters according to the invention are dissolved, in a manner which is in itself known, in a copolymerisable monoethylenically unsaturated monomer usually employed for the manufacture of unsaturated polyester resins, for example, a vinyl monomer such as styrene, an acrylic or methacrylic monomer such as acrylonitrile or methylmethacrylate or an allyl monomer such as diallyl phthalate. Preference, however, is given to styrene.

It is known that the amount of crosslinking agent can vary within considerable limits. It depends especially on the nature of the crosslinking agent as well as on the chemical and physical properties desired in the final product. As a general rule, the higher is the proportion of crosslinking agent, the more flexible and less hard is the final product. The usual proportion is 20 to 50% by weight, and preferably 30 to 40% by weight, relative to the polyester. It is, however, possible to use higher or lower proportions if desired.

The unsaturated polyester resins according to the invention can moreover contain various additives such as polymerisation inhibitors or promoters, gelling inhibitors, stabilisers, inorganic or organic fillers such as glass fibres, pigments, dyestuffs, auxiliary flameproofing agents such as antimony and phosphorus compounds, and the like.

The actual copolymerisation or crosslinking of the unsaturated polyester resins of the invention is carried out in a manner which is in itself known in the presence of vinyl polymerisation initiators and preferably chemical initiators of the type possessing free radicals such as benzoyl peroxide or methyl ethyl ketone peroxide.

The conjoint use of several super-halogenated unsaturated polyesters according to the invention or the addition of other unsaturated polyesters, for example conventional commercial polyesters, to the super-halogenated unsaturated polyesters according to the invention also fall within the scope of the present invention.

The examples which follow illustrate the invention without however limiting it.

EXAMPLES 1 TO 3

These examples, the particular characteristics of which are given in the attached Table I, relate to the manufacture of substantially alternating super-clorinated unsaturated polyesters by copolymerisation of epichlorohydrin and maleic anhydride in the presence of $TiCl_4$.

The manufacture is carried out in a 10 l 3-necked flask placed in a thermostatically controlled bath at 60°C and equipped with a glass stirrer with blades, a thermometer, a dropping funnel and a device for flushing with nitrogen. The apparatus is evacuated and then flushed with nitrogen three times so as to drive off all the air present in the flask and the dropping funnel.

2 l of dichloroethane and amounts of maleic anhydride and $TiCl_4$ corresponding to those given in Table I are introduced successively into the flask. After the maleic anhydride has dissolved completely, epichlorohydrin is introduced gradually at a rate such that the temperature of the mixture does not exceed 80°C. Samples of the reaction mixture, removed at regular intervals, are investigated by infra-red spectrometry. The reaction is considered to be complete when two consecutive spectra are identical. The reaction mixture is then cooled to ambient temperature and the catalyst is decomposed by treatment with dilute hydrochloric acid. The reaction product is filtered off, and finally washed with water until no trace of acidity remains, dried and evaporated.

The composition of the polyesters is determined from nuclear-magnetic resonance spectrograms which provide the molar ratio of epihalohydrin to anhydride and from the proportion by weight of carbon determined by elementary analysis.

The halogen content arising from super-halogenation is calculated by the difference between the overall halogen content and the halogen content originating from the epihalohydrin.

Comparison of Examples 1, 2 and 3 shows that the molecular weight and the degree of super-halogenation of the polyesters according to the invention can be controlled and are essentially a function of the initial $TiCl_4$ content.

EXAMPLE 4

This example relates to the manufacture of a chlorinated unsaturated polyester by copolymerisation of 39 mols of epichlorohydrin, 17.34 mols of maleic anhydride and 8.67 mols of phthalic anhydride (PA) in the presence of 3.9 mols of $TiCl_4$, in accordance with an identical procedure to that described above.

The degree of conversion increased to 87.4% and the chlorinated unsaturated polyester obtained had an average molecular weight of 625, a specific gravity of 1.415 g/ml at 20°C and acid and hydroxyl numbers, expressed as g of group/kg, respectively of 0.69 and 0.59.

The composition of the chlorinated unsaturated polyester was as follows:

| | | |
|---|---|---|
| molar ratio EPI/MA + PA | | 1.7 |
| chlorine content, % by weight | total chlorine | 25.38 |
| | chlorine provided by $TiCl_4$ | 3.51 |

EXAMPLE 5

This example relates to the manufacture of a chlorobrominated unsaturated polyester by copolymerisation of 39 mols of epichlorohydrin and 26 mols of maleic anhydride in the presence of 3.9 mols of $TiBr_4$, following a procedure in accordance with that described above. The degree of conversion increased to 84% and the chlorobrominated unsaturated polyester obtained had a specific gravity of 1.533 g/ml at 20°C, an average molecular weight of 670, and acid and hydroxyl numbers, expressed as g of group/kg, respectively of 0.6 and 0.7.

The composition of the chlorobrominated unsaturated polyester was as follows:

| | |
|---|---|
| molar ratio EPI/MA | 1.43 |
| chlorine content, % by weight | 18.5 |
| bromine content, % by weight | 14 |

EXAMPLE 6

This example relates to the manufacture of a chlorobrominated polyester of copolymerisation of 35.1 mols of epichlorohydrin, 3.9 mols of epibromohydrin and 26 mols of maleic anhydride, in the presence of 3.9 mols of $TiCl_4$.

The degree of conversion increased to 85% and the chlorobrominated polyester obtained had an average molecular weight of 950, a specific gravity of 1.460 g/ml at 20°C, and acid and hydroxyl numbers, expressed as g of group/kg, respectively of 0.3 and 0.7.

The composition of the chlorobrominated unsaturated polyester was as follows:

| | |
|---|---|
| molar ratio EPI + epibromohydrin/MA | 1.44 |
| total chlorine content, % by weight | 22.1 |
| chlorine content provided by $TiCl_4$, % by weight | 5.7 |
| bromine content, % by weight | 4.3 |

EXAMPLES 7 TO 9

These examples relate to crosslinked resins manufactured by employing chlorinated unsaturated polyesters according to the invention, after partial isomerisation of the maleic double bonds.

Three samples of chlorinated unsaturated polyester manufactured according to Example 1 were subjected to a non-catalytic thermal isomerisation at 120°C for the periods of time given in Table II.

The three samples of chlorinated unsaturated polyesters isomerised respectively to degrees of 20%, 45% and 70% were mixed with styrene in such a way as to produce mixtures containing 35% by weight of styrene. 1.5% by weight of a solution containing 50% of benzoyl peroxide, 0.25% by weight of a solution of cobalt octoate containing 1% of cobalt and 3% by weight of epoxidised soya oil were then added and this mixture was cast in the form of a sheet. The sheet was then kept for 4 hours at ordinary temperature and cured thereafter by heating at 100°C for 6 hours in order to produce transparent products, with a very slight yellow colour.

The mechanical properties of the crosslinked resins are given in the attached Table II and their fire-resistance properties are given in the attached Table III.

TABLE I

| | Starting constituents | | | Degree of conversion % by weight | Molar ratio EPI/ MA | Composition of the polyester | | Characteristics of the polyester | | | |
|---|---|---|---|---|---|---|---|---|---|---|---|
| | | | | | | Chlorine content, % by weight | | | | Acid number, g of group/ kg | Hydroxyl number g of group/ kg |
| Experiment No. | Number of mols employed * | | | | | Total chlorine | Chlorine provided by TiCl$_4$ | Average molecular weight | Specific gravity, 20°C g/ml | | |
| | EPI | MA | TiCl$_4$ | | | | | | | | |
| 1 | 39 | 26 | 3.9 | 94.5 | 1.46 | 28.80 | 8.3 | 500 | 1.425 | 0.74 | 1.29 |
| 2 | 39 | 26 | 1.95 | 84.4 | 1.34 | 25.75 | 5.5 | 915 | 1.430 | 0.24 | 1.10 |
| 3 | 35.5 | 29.5 | 3.9 | 86.1 | 1.22 | 26.97 | 8.1 | 549 | 1.428 | 1.04 | 1.48 |

* Abbreviations used:
EPI = epichlorohydrin
MA = maleic anhydride

TABLE II

| | Isomerisation of the polyester | | Mechanical properties of the crosslinked resins | | | Temperature of deflection under load °C ASTM D 648 (264 psi) |
|---|---|---|---|---|---|---|
| Experiment No. | Duration | Degree of isomerisation, molar % | Rockwell hardness | Flexural modulus ASTM D 790, kg/mm$^2$ | Flexural strength | |
| 7 | 1 hr. 25 mins. | 20 | 75 | 232 | Does not break | + 45 |
| 8 | 4 hrs. 25 mins. | 45 | 88 | 289 | 7.2 | + 65 |
| 9 | 7 hrs. 45 mins. | 70 | 92 | 304 | 6.6 | + 95 |

TABLE III

| | Fire-resistance of the crosslinked resins | | |
|---|---|---|---|
| | ASTM Test D 635 | | |
| Experiment No. | Length burned, cm | Duration of non-supported burning, seconds | ISO Test R 181 according to Schramm |
| 7 | 0 | 98 | 1.9 |
| 8 | 0 | 115 | 2.0 |
| 9 | 0.12 | 182 | 1.9 |

I claim:

1. Unsaturated halogenated polyesters having an average molecular weight of between 300 and 3,000 and a halogen content, in addition to the halogen content provided by the halogen of the monomers incorporated into the polymeric chain, of between 1 and 35% by weight which are obtained by copolymerizing (1) an α-epihalohydrin selected from the group consisting of epichlorohydrin, epibromohydrin and their mixtures with (2) an organic anhydride selected from the group consisting of maleic anhydride and mixtures thereof with another cyclic organic anhydride selected from the group consisting of succinic anhydride, glutoric anhydride, citraconic anhydride, itaconic anhydride, tetrahydrophthalic anhydride, methylnadic anhydride, phthalic anhydride, dichloromaleic anhydride, tetrabromophthalic anhydride and chlorendic anhydride wherein not more than one mol of said another cyclic organic anhydride is used per mol of maleic anhydride in the presence of a catalyst consisting essentially of titanium tetrachloride or titanium tetrabromide, the molar ratio of the α-epihalohydrin and the organic anhydride being between 1:1 and 2:1 and the molar ratio of the titanium tetrachloride or titanium tetrabromide and the sum of epihalohydrin and organic anhydride being between 0.001 and 0.1.

2. Unsaturated polyesters according to claim 1 wherein said another cyclic organic anhydride is phthalic anhydride.

3. Unsaturated polyesters according to claim 1 wherein the halogen content which is in addition to the halogen content provided by the monomers is from 3.5 to 14%.

4. Unsaturated polyesters according to claim 1 wherein the halogen content which is in addition to the halogen content provided by the monomers is from 5.5 to 14%.

5. Process for the manufacture of unsaturated halogenated polyesters having an average molecular weight of between 300 and 3,000 and a halogen content, in addition to the halogen content provided by the halogen of the monomers incorporated into the polymeric chain, of between 1 and 35% by weight comprising: copolymerizing (1) an α-epihalohydrin selected from the group consisting of epichlorohydrin, epibromohydrin and their mixtures with (2) an organic anhydride selected from the group consisting of maleic anhydride and mixtures thereof with another cyclic organic anhydride selected from the group consisting of succinic anhydride, glutoric anhydride, citraconic anhydride, itaconic anhydride, tetrahydrophthalic anhydride, methylnadic anhydride, phthalic anhydride, dichloromaleic anhydride, tetrabromophthalic anhydride and chlorendic anhydride wherein not more than one mol of said another cyclic organic anhydride is used per mol of maleic anhydride in the presence of a catalyst consisting essentially of titanium tetrachloride or titanium tetrabromide, the molar ratio of the α-epihalohydrin and the organic anhydride being between 1:1 and 2:1 and the molar ratio of the titanium tetrachloride or titanium tetrabromide and the sum of epihalohydrin and organic anhydride being between 0.001 and 0.1.

6. The process according to claim 5 wherein said another cyclic organic anhydride is phthalic anhydride.

7. The process according to claim 5 wherein the halogen content which is in addition to the halogen content provided by the monomers is from 3.5 to 14%.

8. The process according to claim 5 wherein the halogen content which is in addition to the halogen content provided by the monomers is from 5.5 to 14%.

* * * * *